Dec. 10, 1968　　　E. A. LITTLE　　　3,414,946

LOCKING TYPE SAFETY PIN

Filed March 2, 1967

INVENTOR.
EDWARD A. LITTLE
BY Steward & Steward

ATTORNEYS

United States Patent Office 3,414,946
Patented Dec. 10, 1968

3,414,946
LOCKING TYPE SAFETY PIN
Edward A. Little, Wolcott, Conn., assignor to The Risdon Manufacturing Company, Naugatuck, Conn., a corporation of Connecticut
Filed Mar. 2, 1967, Ser. No. 620,166
2 Claims. (Cl. 24—158)

ABSTRACT OF THE DISCLOSURE

A safety pin of the guard-locking type in which the point guard is slidable axially of the legs of the pin from an inner locking position to an outer unlocked position, and wherein provision is made for frictional resistance to sliding movement of the guard to insure against inadvertent movement of it to the unlocked position.

---

The present invention is directed to a safety pin construction, and more particularly to a safety pin incorporating a point shield or guard which is movable to and from a locked position.

Locking type safety pins of various designs have long been known. For the most part, however, they are characterized either by a rather complicated design and hence are expensive to manufacture or else the design is insufficient to provide the desired degree of locking assurance.

It is a principal purpose of the present invention accordingly to provide a safety pin which gives, first of all, assurance of secure locking in the safe position to prevent inadvertent release of the pointed leg; and concomitantly with such improved locking provision provides a design of simple construction that is readily mass manufactured whereby the pin is competitive with the common non-locking type of safety pin.

The pin of the present invention is intended primarily for use as a diaper pin but is obviously useful wherever a safety pin having assured locking against accidental release of the point is important.

The invention is illustrated by the embodiment shown in the accompanying drawings and described in detail hereinafter. In the drawings.

Figure 1:
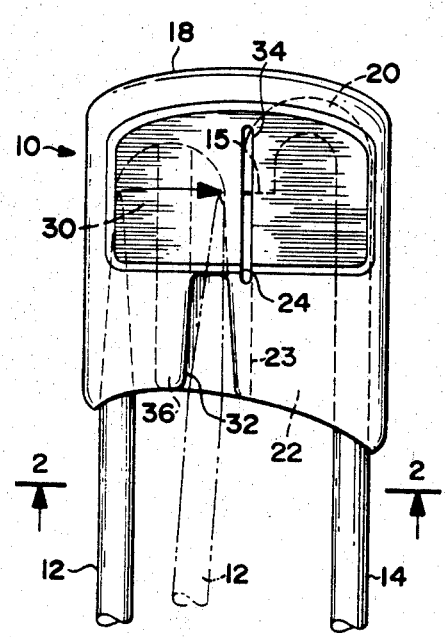
FIG. 1 is a fragmentary view of the head portion of a safety pin embodying the invention.

Safety pin 10 comprises a resilient stainless steel wire portion or the like constituting a front leg 12 and a back leg 14 which are integrally joined by a bight or loop 16 adapted to keep the two legs in the same plane but to urge them out of parallelism. Safety pin 10 is also provided with a single head member 18 which, in the specifically illustrated modification, is formed of stiff molded plastic. As will be explained in more detail presently, head 18 is carried by back leg 14 and is axially slidable on that leg between an inner position, which is illustrated in FIG. 1, and an outer position as shown in solid line in FIG. 3.

The free end of back leg 14 is curled back upon itself in the plane of the legs to form a return bend, such as loop or U 20. Head 18 is molded to provide a first socket means 22 within which U 20 is received with a close sliding fit. The open leg 15 of U 20 has a tendency to spring open to a limited extent and this produces additional frictional engagement of the parts yieldably restraining axial movement of head 18 relative to the legs of the pin.

In the embodiment shown, partition 23 is stepped downwardly, as at 24. Step 24 provides an abutment 28 against which the open leg 15 of the U comes in contact when the head is in its outer position, as shown in solid line in FIG. 3. This restrains the head normally against disengagement from leg 14 but, with the resiliency or spring action afforded by U 20, sufficient flexing is permitted during initial assembly of the head 18 on the pin to allow the open leg 15 of the U to be forced over abutment 28 to arrive at a position opposite step 24 without breaking or distorting the head.

Figure 2:
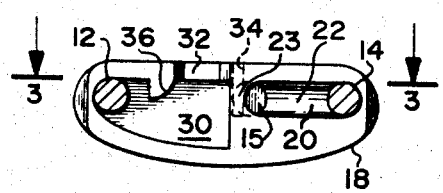
FIG. 2 is a sectional view taken on line 2—2 of FIG. 1 looking in the direction of the arrows.

Further inward sliding movement of head 18 against the frictional pressure exerted by the legs of the U on the opposite side walls of socket 22 causes the head to assume its alternate or locking position on step 24 as seen in FIG. 1 and in dotted line representation in FIG. 2.

Leg 12, the front leg, is pointed in the usual manner and is adapted to be received in another socket portion 30 of the head 18. To permit entry and egress of the point, head 18 is provided with an access notch 32 in a side wall which notch opens onto socket 30. Notch 32 has an axial extent, as seen in FIG. 1, which is substantially less than the full depth of the socket and is so designed that, when head 18 is located at its inner (locked) position as seen in FIG. 1, the pointed leg 12 may not be entered into or released from socket 30 laterally thereof, even though front leg 12 is compressed toward rear leg 14 to the dotted line position shown in FIG. 1. Thus the safety pin is effectively locked against accidental release of the pin.

Figure 3:
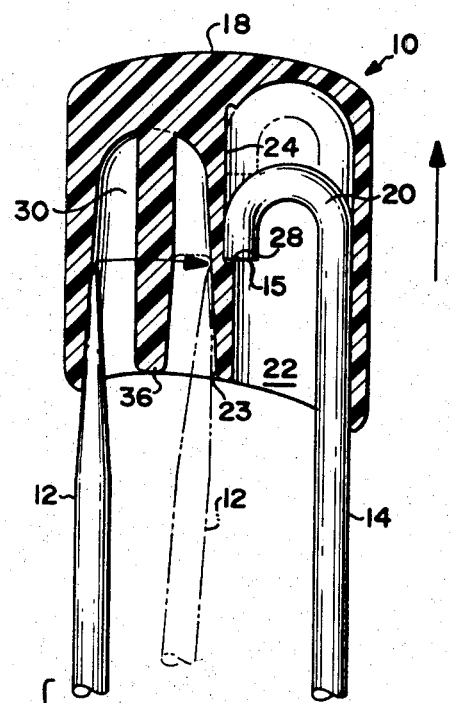
FIG. 3 is a longitudinal sectional view on line 3—3 of FIG. 2, parts being broken away for clarity of illustration.
Figure 3:
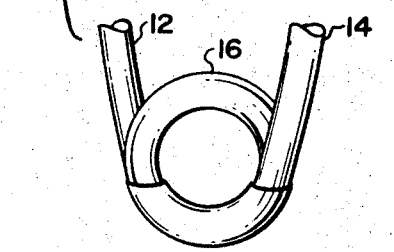

Upon axially sliding head 18 outwardly relative to the legs of the pin, to the solid line position shown in FIG. 3, the pointed tip of front leg 12 will then just clear the upper end of access notch 32 so that the point may be laterally withdrawn from socket 30 in the usual manner. Similarly, of course, the pointed tip of leg 12 may be entered into socket 30 through access 32 when head 18 is in the aforesaid outer position. The pin is then locked simply by sliding head 18 inwardly relative to the legs of the pin to resume the position shown in FIG. 1.

As here illustrated, head 18 is formed with a side aperture 34 coincident with step 24 in socket 22. While this aperture 34 is used primarily for simplification of the molding of the recessed step 24, it serves a further useful purpose in providing a visual indication to the user that the pin is either in its locked or unlocked condition.

The invention is capable of various other modifications than that specifically here illustrated. Thus the bent end or rear leg 14 may assume specifically different configurations other than the U here shown. For example, the short leg 15 may be bent further toward the back leg to form a substantially closed loop or "eye." In such case step 24 may be provided with an intermediate detent bump of cam in partition 23 separating the areas contacted by the bent end of leg 14 in the respective locked and unlocked positions of the head of the pin to supplement the frictional resistance to movement of the head from one position to the other.

As an added safety precaution, it may be desirable at times to form the head 18 with a guard flange 36 in socket 30, as illustrated in FIGS. 2 and 3, which runs lengthwise of the socket immediately adjacent the outer edge of access notch 32. In order to release the pointed leg 12 of the pin, it is then necessary not only to compress the two legs together but to twist them slightly so as to cause leg 12 to pass over the guard flange 36 before being brought into registry with access notch 32.

While head 18 is illustrated as formed of molded plastic, it will be apparent that a formed metal equivalent could be substituted.

These and other modifications will be obvious to those skilled in the art and the following claims are accordingly intended to cover such modifications which are the legal equivalents of the embodiment shown and described.

What is claimed is:

1. A safety pin of resilient wire having a relatively stationary back leg and a relatively movable front leg,
(a) said legs being connected at one end by an integral bight forming a spring normally urging said front leg away from said back leg;
(b) said front leg being pointed at its free end,
(c) said back leg having a return bend at its free end,
(d) a point-shielding head having first socket means slidably receiving said bent free end of the rear leg, the bend in said rear leg being resilient and producing frictional engagement with the wall of said socket means to yieldably resist movement of said head axially of said leg;
(e) said head also having other socket means for receiving and shielding the point of said front leg, said other socket means including a lateral access in a wall of said head for the side entry or egress of said point when the front leg is compressed toward the rear leg and said head is in its outer position on the rear leg, said access being of insufficient axial extent to permit entry or egress of said point when the head is in its inner position on the rear leg, said sockets being arranged in side-by-side relationship with a common wall therebetween provided with a step in the surface thereof contacted by the return bend of the rear leg to form a detent restraining axial separation of the head from said leg.

2. A safety pin as defined in claim 1, wherein said head is provided with an axially extending aperture in its side wall communicating with said first socket means substantially coincident with the step in said common wall to provide visual indication of the axial position of the head on the legs of the pin.

References Cited

UNITED STATES PATENTS

| 1,451,478 | 4/1923 | Smith et al. | 24—158 |
| 2,351,569 | 6/1944 | White | 24—156 |
| 3,179,995 | 4/1965 | Hawk | 24—158 |
| 2,353,560 | 7/1944 | Harper | 24—156 |

FOREIGN PATENTS

| 130,109 | 1/1902 | Germany. |
| 462,757 | 7/1928 | Germany. |
| 597,959 | 2/1948 | Great Britain. |

DONALD A. GRIFFIN, *Primary Examiner.*